(12) United States Patent
Tazaki et al.

(10) Patent No.: US 7,188,892 B2
(45) Date of Patent: Mar. 13, 2007

(54) FRONT END MODULE ASSEMBLY STRUCTURE

(75) Inventors: Yuichi Tazaki, Ebina (JP); Masaki Yoshimitsu, Fujisawa (JP); Satoshi Shiga, Yokohama (JP)

(73) Assignees: Nissan Motor Co., Ltd., Kanagawa-Ken (JP); Calsonic Kansei Corporation, Tokyo (JP)

( * ) Notice: Subject to any disclaimer, the term of this patent is extended or adjusted under 35 U.S.C. 154(b) by 24 days.

(21) Appl. No.: 11/082,910

(22) Filed: Mar. 18, 2005

(65) Prior Publication Data

US 2005/0206200 A1    Sep. 22, 2005

(30) Foreign Application Priority Data

Mar. 22, 2004   (JP) .......................... P2004-082289

(51) Int. Cl.
*B62D 25/08*    (2006.01)

(52) U.S. Cl. .................. 296/193.09; 296/29

(58) Field of Classification Search .......... 296/203.01, 296/203.02, 193.09, 29
See application file for complete search history.

(56) References Cited

U.S. PATENT DOCUMENTS 5,114,203 A * 5/1992 Carnes .................. 296/50
6,293,615 B1 * 9/2001 Tarahomi ............... 296/193.09
6,932,397 B2 * 8/2005 Svendsen et al. ........... 293/117

FOREIGN PATENT DOCUMENTS

| EP | 0 945 330 | 9/1999 |
| JP | 03-284481 | 12/1991 |
| JP | 03-284482 | 12/1991 |
| JP | 04-063774 | 2/1992 |
| WO | WO 02/070327 | 9/2002 |

OTHER PUBLICATIONS

Search Report dated Mar. 3, 2006.

* cited by examiner

*Primary Examiner*—Dennis H. Pedder
(74) *Attorney, Agent, or Firm*—McDermott Will & Emery LLP

(57) ABSTRACT

A front end module assembly structure for a vehicle, including: a first bracket plate provided on either a front end module or a side member, which is provided with a through hole and a slit extending upward therefrom; a second bracket plate provided on the other of the front end module and the side member to be mated to the first bracket plate, which has an insertion hole formed thereon at a position corresponding to the slit of the first bracket plate; and a locator piece attached to the second bracket plate. The locator piece has a portion configured to be inserted into the slit from a position inside the through hole and held in the slit, and a bottom face configured to be set on a periphery of the insertion hole when the locator piece is inserted into the insertion hole.

4 Claims, 8 Drawing Sheets

FRONT END MODULE ASSEMBLY STRUCTURE

BACKGROUND OF THE INVENTION

1. Field of Invention

The present invention relates to an assembly structure of side members of a vehicle and a front end module thereof assembled to the front ends of the side members.

2. Description of Related Art

Formerly, headlamps and heat-exchanger equipment such as a radiator are attached to or installed on a pre-assembled vehicle body in a former assembly line, specifically to a radiator core support connected to body side members. Therefore, increase in the number of parts to be attached or installed complicates the work performed on the assembly line, lowering the work efficiency.

Recently, in order to improve the work efficiency in the final assembly line, headlamps and heat-exchanger equipment such as a radiator and a capacitor are preliminarily attached to or installed on a radiator core support to form a front end module in a line other than the final assembly line, for example, a line of a parts manufacturing company, and the front end module is fed to the final assembly line, as disclosed in Japanese Patent publications Nos. 2848666, 2898339, and 2907502.

As the number of equipment to be mounted onto the front end module increases, the weight thereof becomes substantially heavy, which makes it difficult for a worker to handle the front end module.

A loading jig for assisting the worker to lift the front end module is therefore provided on the final assembly line. The worker fastens rear ends of both sides of the front end module to the front ends of the side members with bolts and nuts, while lifting the front end module with the loading jig.

In this case, the rear ends of both sides of the front end module and the front ends of the side members have to be positioned accurately.

Figure 10:
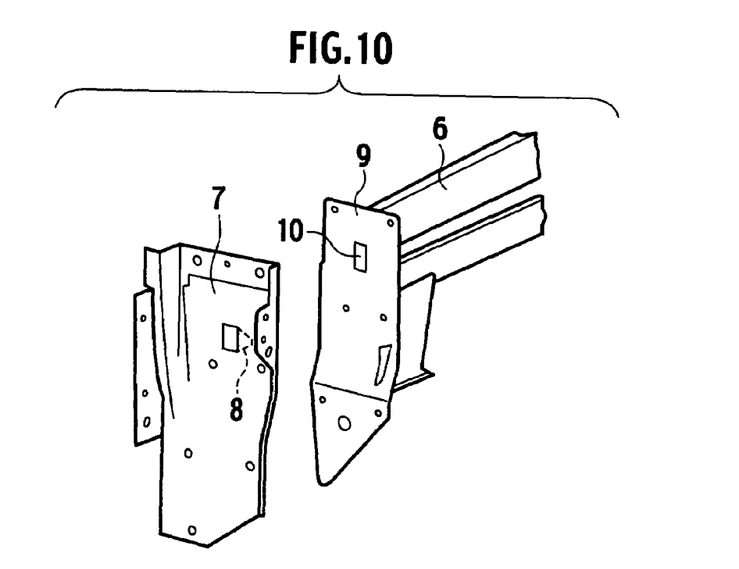
FIG. 10 is an enlarged perspective view showing a part X in FIG. 9.
Figure 11:
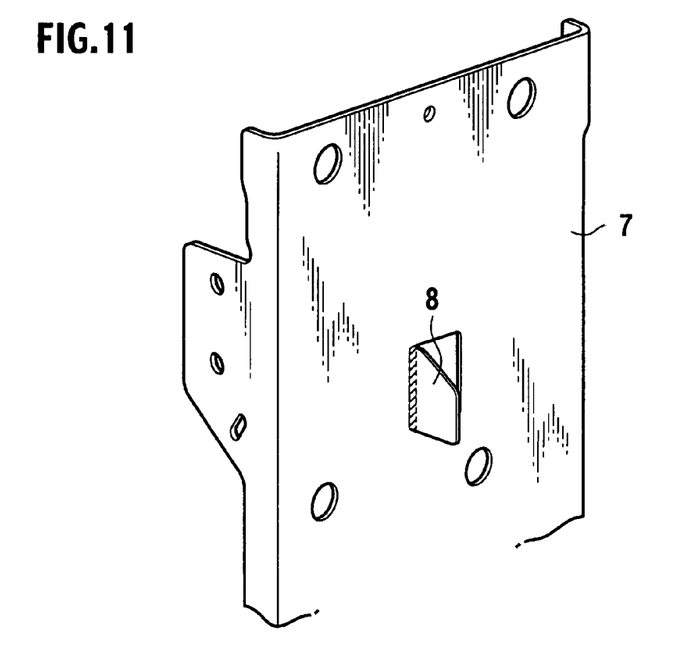
FIG. 11 is a perspective view of the bracket plate attached to the front end module of the comparative example.

FIGS. 9 to 12 show a comparative example of a front end module assembly structure. As shown in FIG. 10, a bracket plate 7 is fixed to each of the rear ends of both sides of the front end module 5. As shown in FIG. 11, a C-shaped cut is made in the center of the bracket plate 7, and the cut portion is folded rearward so as to form an insert piece 8 in substantially a right triangular shape.

Meanwhile, an insertion hole 10 is formed in a bracket plate 9 on the front end of a side member 6 so as to allow the insert piece 8 to be inserted thereinto. When the front end module 5 is connected to the side member 6, the insert piece 8 is inserted into the insertion hole 10, and a vertical positioning of the front end module 5 relative to the side member 6 is performed. Then the bracket plate 7 of the front end module 5 and the bracket plate 9 of the side member 6 are fixed with bolts and nuts.

Figure 12:
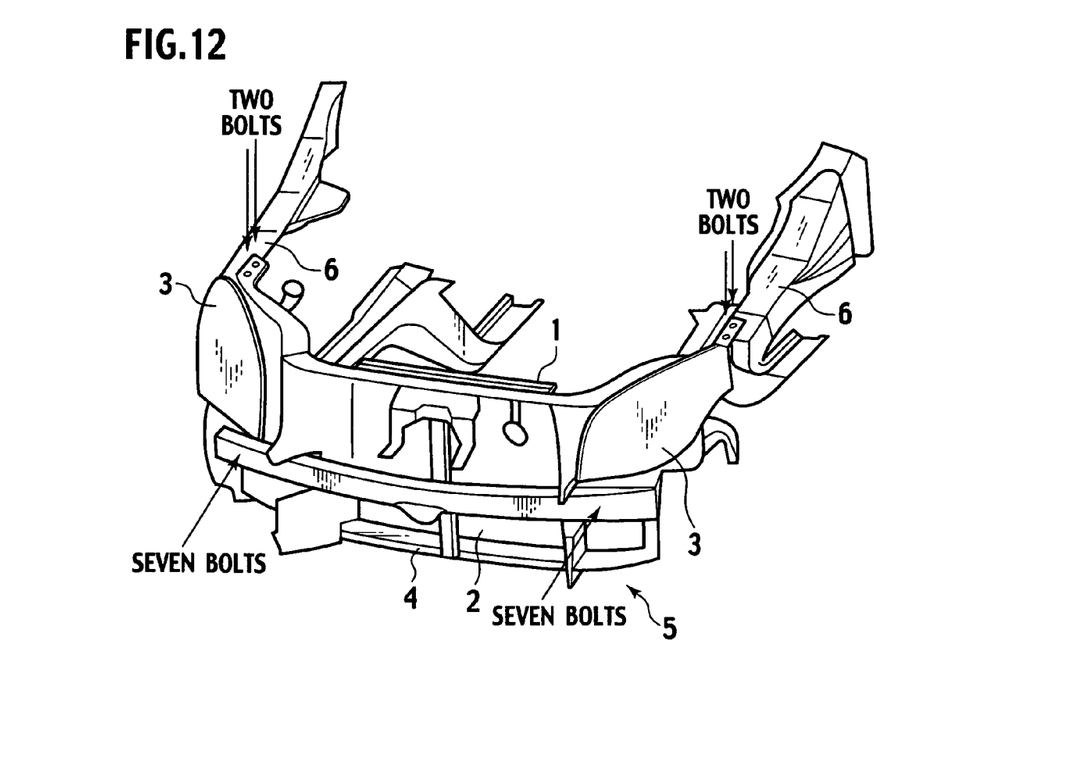
FIG. 12 is a perspective view of the front end module fixed to the side member of the comparative example.

After fastening of the bracket plates 7 and 9, the front portion of the front end module 5 is fixed to the side member 6 with fourteen (14) bolts (seven (7) bolts for each side), and the upper rear end portions are fixed to the side member 6 with four (4) bolts (two (2) bolts for each side) as shown in FIG. 12.

SUMMARY OF THE INVENTION

In the case where the aforementioned loading jig is used for fixing the front end module 5 to the side member 6, the level of the front end module 5 lifted by the loading jig varies between, for example, −3 mm and +3 mm. This lowers the accuracy in positioning of the front end module 5.

In the structure of the comparative example as described above, the positioning of the front end module 5 relative to the side member 6 is performed by inserting the insert piece 8 into the insertion hole 10. Since the insert piece 8 is formed to be slightly smaller than the insertion hole 10 so as to allow easy insertion of the insert piece 8, the aforementioned structure thus cannot improve the accuracy in positioning.

It is an object of the invention to provide a front end module assembly structure that improves the accuracy in positioning of the front end module.

An aspect of the present invention is a front end module assembly structure for a vehicle, comprising: a first bracket plate provided on either a front end module or a side member to which the front end module is assembled, the first bracket plate having thereon a through hole and a slit extending upward from the through hole; a second bracket plate provided on the other of the front end module and the side member to be mated to the first bracket plate, the second bracket plate having an insertion hole formed thereon at a position corresponding to the slit of the first bracket plate; and a locator piece attached to the second bracket plate, the locator piece having a portion configured to be inserted into the slit from a position inside the through hole and held in the slit, and a bottom face configured to be set on a periphery of the insertion hole when the locator piece is inserted into the insertion hole.

BRIEF DESCRIPTION OF THE DRAWINGS

The invention will now be described with reference to the accompanying drawings wherein.

DETAILED DESCRIPTION OF THE PREFERRED EMBODIMENT

An embodiment of the present invention will be explained below with reference to the drawings, wherein like members are designated by like reference characters.

Figure 3:
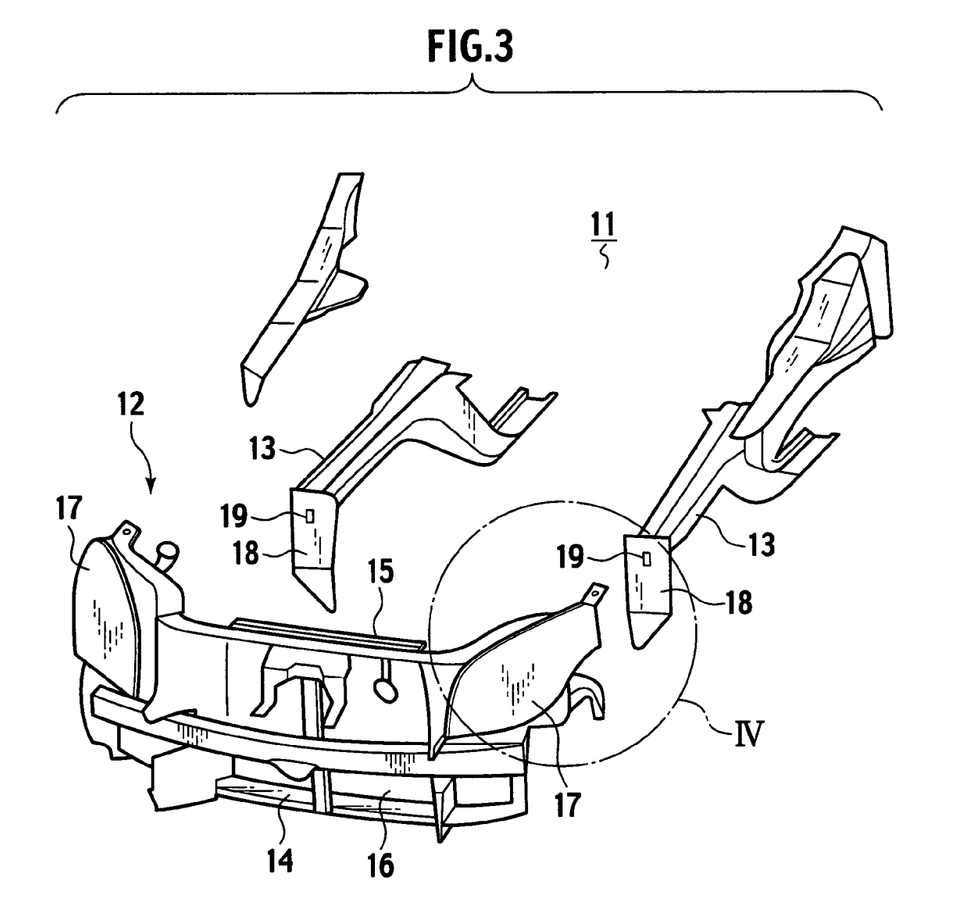
FIG. 3 is a perspective view of a front end of a vehicle in which the front end module assembly structure of the present invention is employed, showing a front end module and a side member thereof.

In a front section of a vehicle where a front end module assembly structure of the present invention is employed, an engine compartment 11 is, as shown in FIG. 3, defined by a pair of side members 13 extending in the vehicle longitudinal direction at both ends of the vehicle in the vehicle transverse direction, a front end module 12 that connects front ends of the side members 13, a dash panel (not shown) provided to the rear parts of the side members 13, and the like.

The front end module 12 includes a radiator core support 14 that extends in the vehicle transverse direction, a radiator 15 as one of heat-exchanger equipment provided on the rear side of the central portion of the radiator core support 14, a capacitor 16 as another heat-exchanger equipment provided on the front side of the central portion, and a pair of headlamps 17 attached to both ends of the radiator core support 14 in the vehicle transverse direction. In addition to those radiator 15, capacitor 16, and headlamps 17, a bumper may be fixed to the front end module 12.

Each front end of the side members 13 is provided with a bracket plate 18 to which the front end module 12 is fixed.

Figure 4:
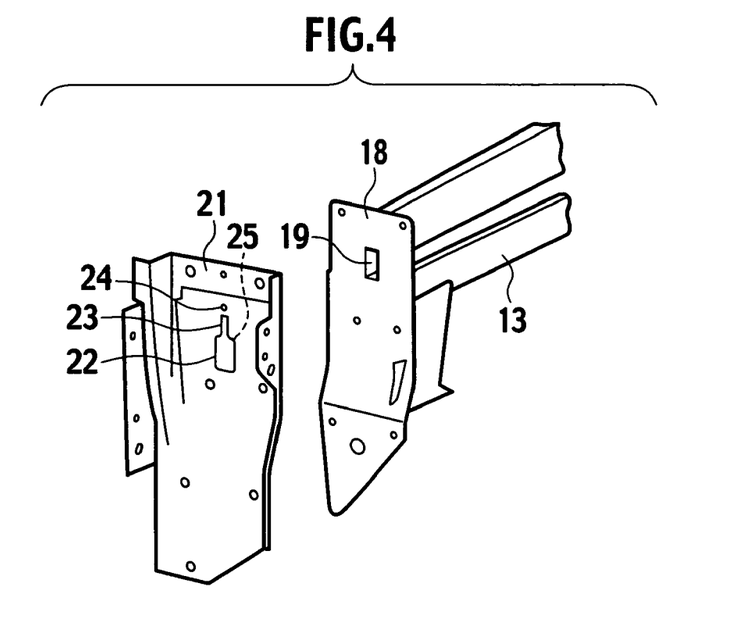
FIG. 4 is an enlarged perspective view showing a part IV in FIG. 3.

Referring to FIG. 4, the front end of the side member 13 is provided with the flat and vertically extending bracket plate 18 with its face directed frontward. A rectangular insertion hole 19 is formed in the center of the bracket plate 18. The insertion hole 19 serves as a drain hole through which a coating material that resides in the side member 13 is drained outside.

Figure 5:
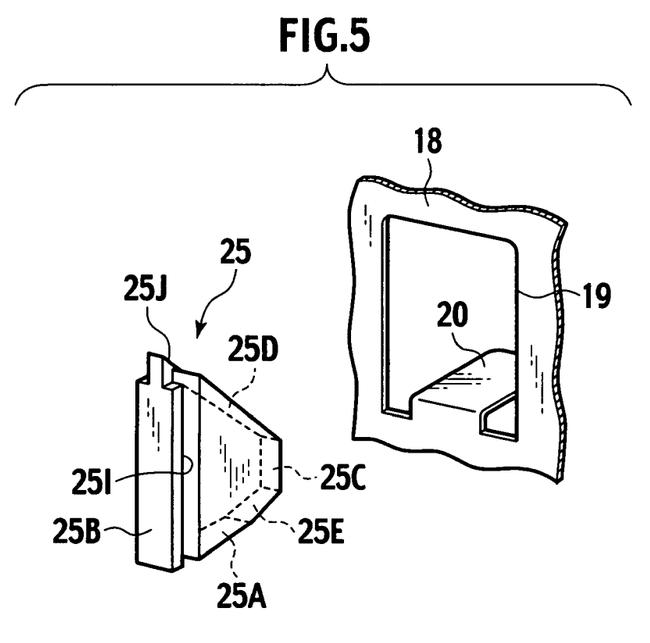
FIG. 5 is a perspective view of an insertion hole formed in the bracket plate of the side member and the locator piece.

Referring to FIG. 5, a tongue piece 20 as a flat plate is formed at the lower periphery of the insertion hole 19, which extends in substantially a horizontal direction inward of the side member 13 (rearward) with its flat top face directed upward. The insertion hole 19 is formed in the bracket plate 18 by making a C-shaped cut with its opening directed downward. Then the inner portion of the cut is folded rearward so as to form the tongue piece 20 integrally with the bracket plate 18.

Figure 1:
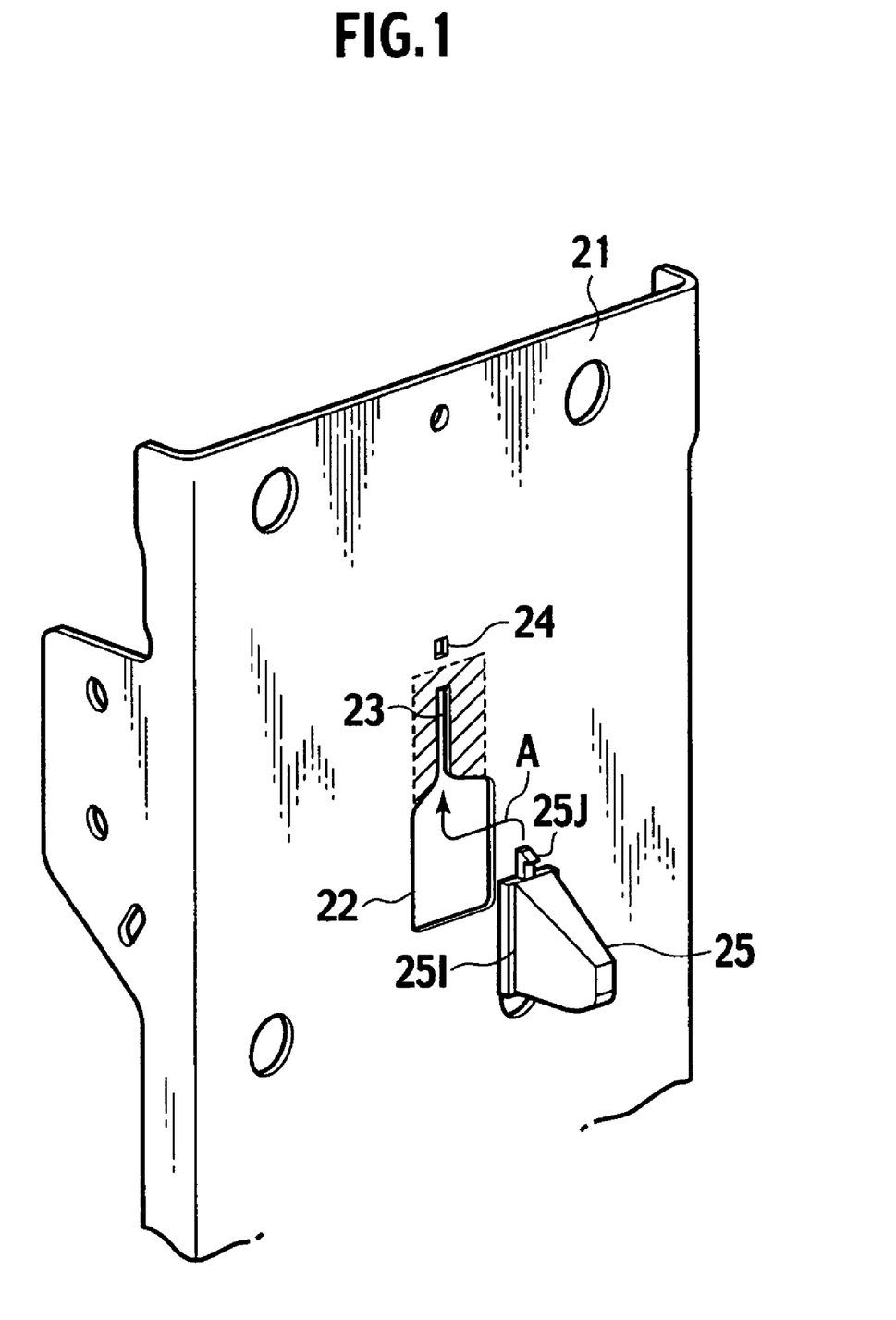
FIG. 1 is a perspective view of a bracket plate attached to a front end module according to a front end module assembly structure of the present invention.
Figure 2:
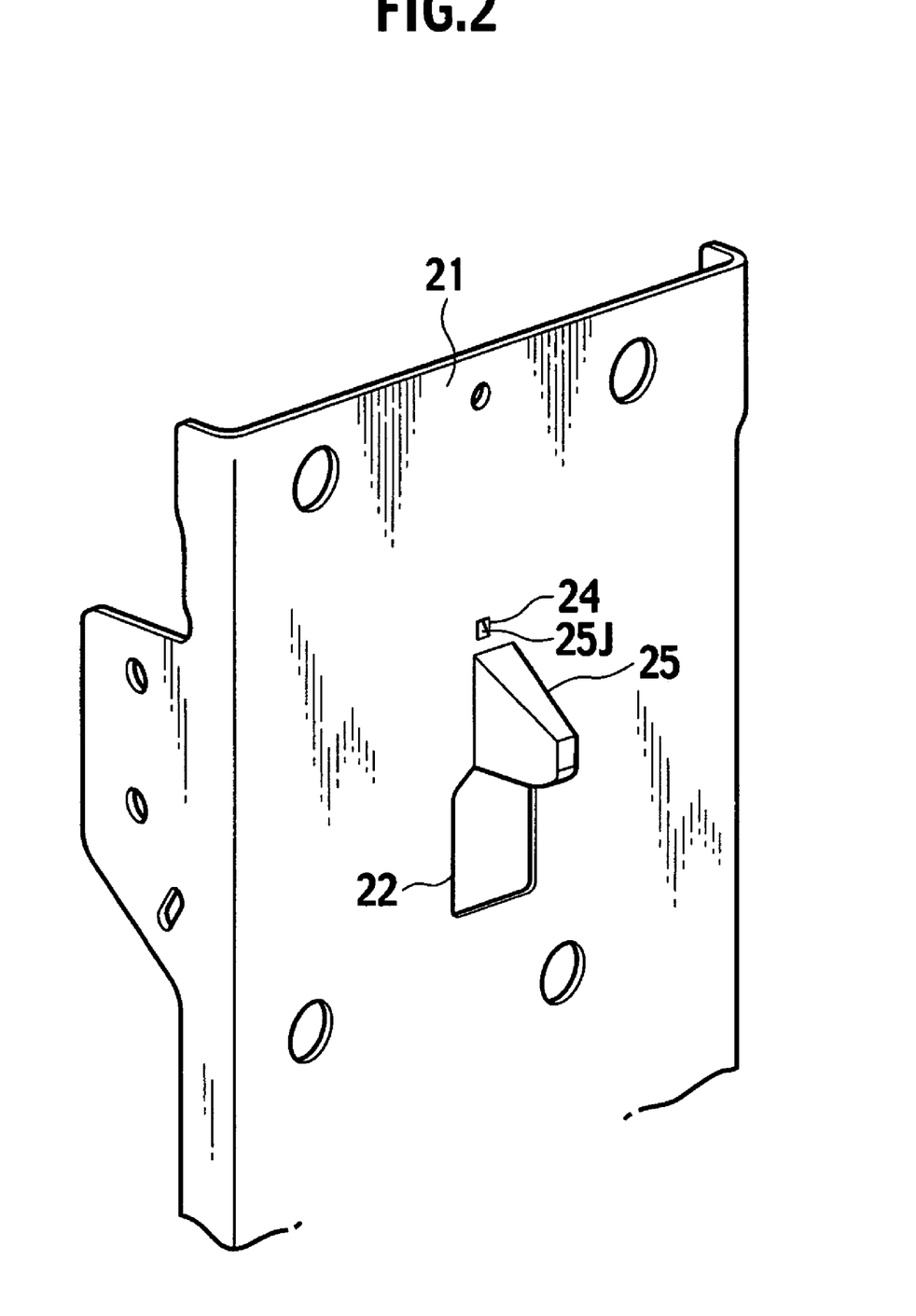
FIG. 2 is a perspective view of a bracket plate of the front end module, and a locator piece fixed thereto.

Each rear end of both end portions of the front end module 12 in the vehicle transverse direction is provided with a flat vertically extending bracket plate 21 having its face directed rearward and formed to conform to the bracket plate 18. A rectangular through hole 22 and a slit 23 provided at a position corresponding to the insertion hole 19 of the bracket plate 18, which continuously extends from the upper portion of the through hole 22, are formed in the center of the bracket plate 21. A rectangular small hole 24 is formed on the upper periphery of the slit 23 on its extended axis.

Figure 6:
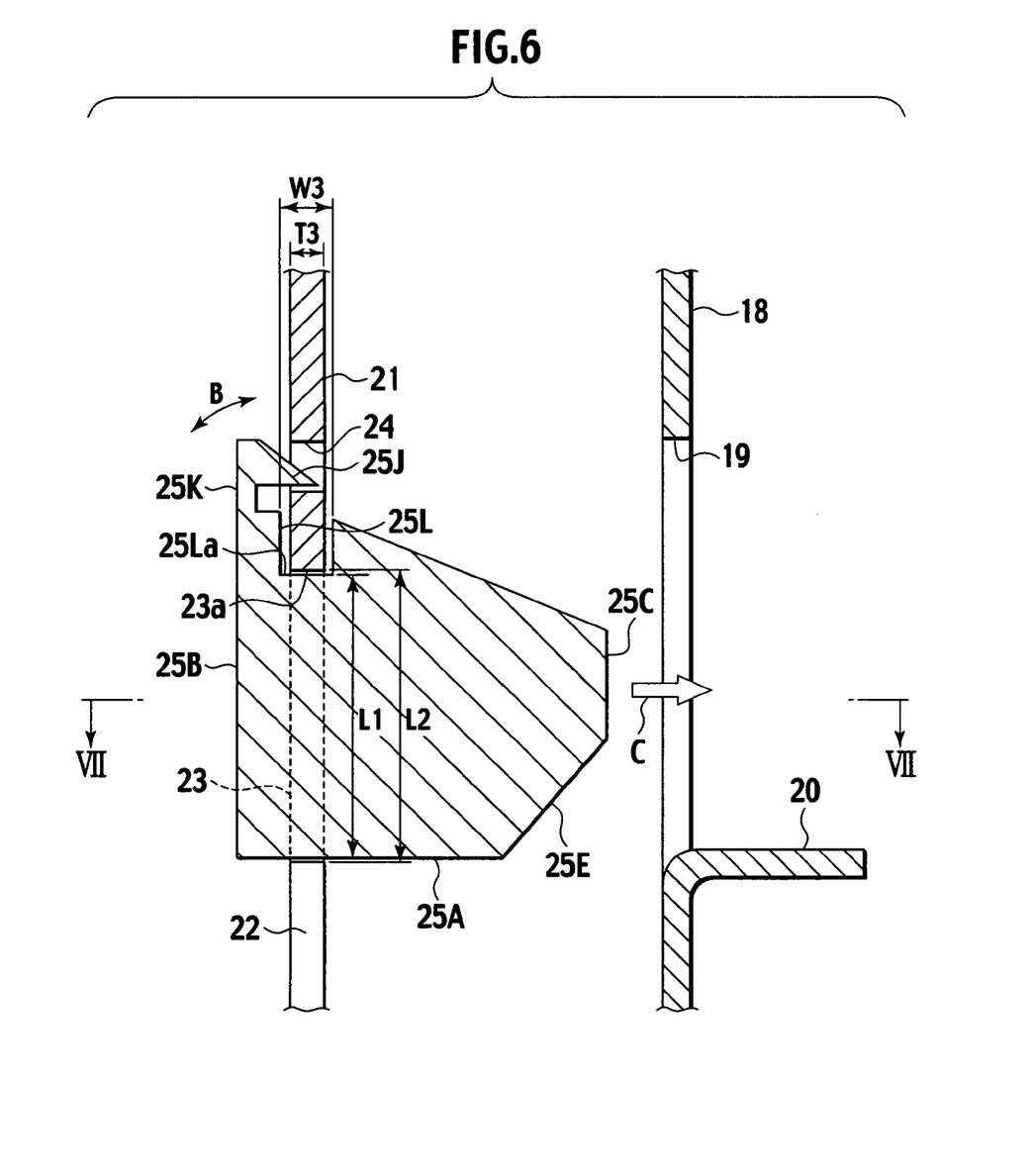
FIG. 6 is a sectional view of the locator piece fixed to the bracket plate of the front end module, and the insertion hole formed in the bracket plate of the side member.

A locator piece 25 formed of a resin material and deformable to a slight degree is fixed to the bracket plate 21 of the front end module. The locator piece 25 has a substantially pentagon-shaped side view as shown in FIG. 6, which includes a flat bottom face 25A that is horizontally arranged upon fixation, a back face 25B and a front face 25C both perpendicular to the bottom face 25A, an upper inclined face 25D with its height at the side of the back face 25B greater than that at the side of the front face 25C, each end of which intersects with the back face 25B and the front face 25C, and a lower inclined face 25E with its height at the front face 25C greater than that at the side of the front face 25C, each end of which intersects with the bottom face 25A and the front face 25C, respectively.

Figure 7:
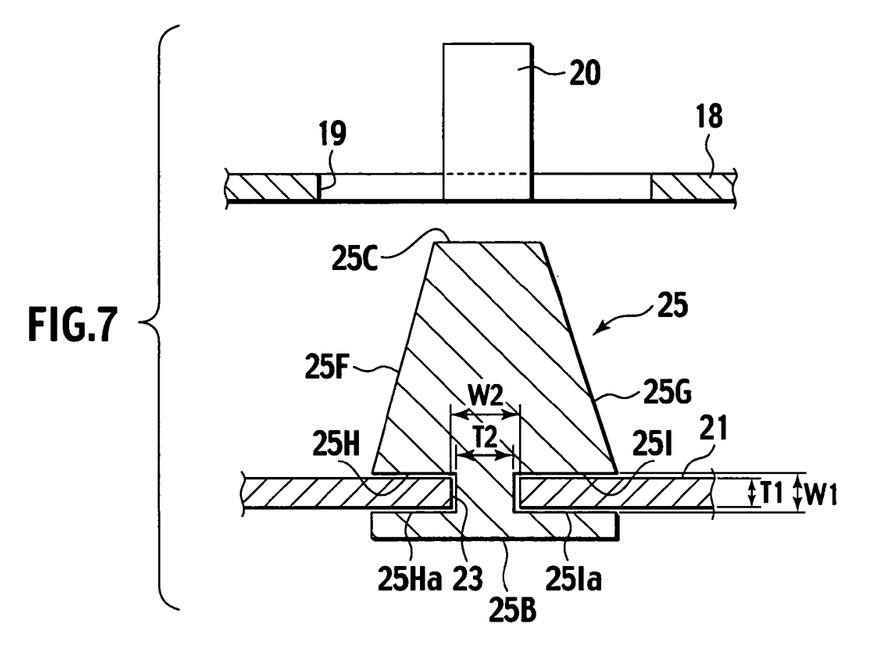
FIG. 7 is a sectional view taken along line VII—VII in FIG. 6.
Figure 8:
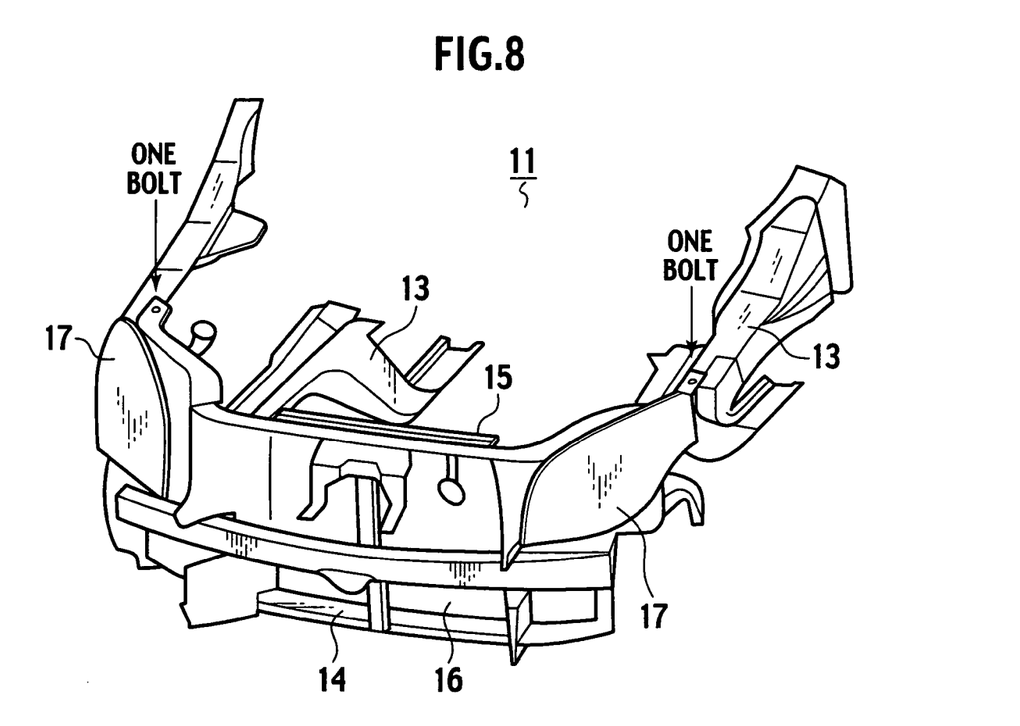
FIG. 8 is a perspective view of the front end module fixed to the side member.
Figure 9:
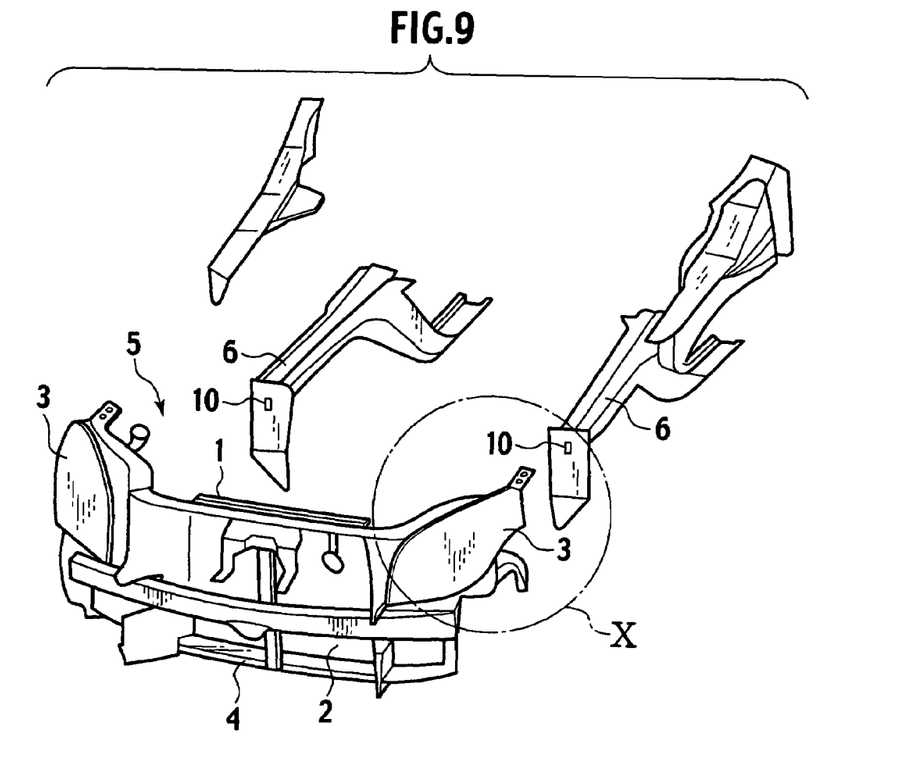
FIG. 9 is a perspective view of a front end module and a side member as a comparative example.

The distance between right and left side faces of the locator piece 25, that is, 25F and 25G is gradually decreased from the back face 25B to the front face 25C as shown in FIG. 7 such that a wedge shape is defined in section by the side faces 25F, 25G, and the front face 25C. Note that each description of the bottom face 25A, back face 25B, front face 25C, and side faces 25F, 25G is determined irrespective of the longitudinal or the transverse direction of the vehicle.

Referring to FIGS. 5 and 7, vertical grooves 25H, 25I are formed in the side faces 25F, 25G of the locator piece 25 around the back face 25B in parallel therewith, which extend in the vertical direction. The portion around the back face 25B of the locator piece 25 is formed as an attachment portion thereof having an H-like horizontal cross section. Each length L1 of bottom portions 25Ha, 25Ia of the vertical grooves 25H, 25I is made slightly shorter than the length L2 of the slit 23. Each width W of the vertical grooves 25H, 25I is made slightly smaller than the thickness T1 of the peripheral portion of the slit 23. The thickness T2 of the distance between the bottom portions 25Ha and 25Ia of the vertical grooves 25H, 25I of the attachment portion is made slightly greater than the width W2 of the slit 23.

A protrusion 25J is formed as an engaging portion on the top of the locator piece 25. The protrusion 25J has a substantially triangular vertical cross section with its top end directed outward (to the upper side of the front face 25C). The lower portion of the protrusion 25J is formed as a neck portion 25K with its width reduced. The protrusion 25J is elastically swingable around the neck portion 25K in the direction B as shown in FIG. 6. The end portion of the back face 25B behind the upper inclined face 25D downward of the protrusion 25J is provided with a lateral groove 25L that horizontally extends (in the vertical direction of FIG. 6). The width W3 of the lateral groove 25L is made slightly smaller than the thickness T3 of the upper periphery of the slit 23.

Operations of the above-structured front end module assembly structure will be described.

The locator piece 25 is inserted from its back face 25B into the through hole 22 formed in the bracket plate 21 of the front end module as indicated by arrow A of FIG. 1, and the portion between the bottom portions 25Ha and 25Ia of the vertical grooves 25H and 25I (web portion of the H-shaped cross section) is aligned with the center axis of the slit 23 before fixation of the front end module 12 to the side member 13. As the locator piece 25 is moved upward, both peripheral portions of the slit 23 are fit with the vertical grooves 25H, 25I of the locator piece 25. Each of the vertical grooves 25H, 25I has a width W1 slightly smaller than the thickness T1 of the peripheral portion of the slit 23. The locator piece 25 may be elastically deformed such that each width W1 of the vertical grooves 25H, 25I can be easily widened. This may allow both peripheries of the slit 23 to be easily fit with the vertical grooves 25H, 25I, respectively.

As the locator piece 25 is further moved upward, the protrusion 25J formed at the upper portion of the locator piece 25 swings by the deformation of the neck portion 25K so as to be positioned over the upper periphery of the slit 23. When the tip of the neck portion 25K is moved over the upper periphery of the slit 23, it is elastically deformed such that the tip of the protrusion 25J is fit with the small hole 24. At this time, a lower face 23a of the upper periphery of the slit 23 is brought into abutment on a bottom portion 25La of the lateral groove 25L of the locator piece 25. This may regulate the upward movement of the locator piece 25, thus tightly fixing the locator piece 25 to the bracket plate 21 of the front end module.

Upon fixation of the front end module 12 to the side member 13, the front end module 12 is lifted by the loading jig (not shown) and the bracket plate 21 of the front end module 12 is aligned with the bracket plate 18 of the side member 13 such that the locator piece 25 is inserted into the insertion hole 19 as indicated by arrow C of FIG. 6. As the locator piece 25 and the insertion hole 19 are respectively formed in the center of the bracket plate 21 of the front end module and in the center of the bracket plate 18 of the side member, it is difficult for the operator to confirm locations of the locator piece 25 and the insertion hole 19 upon the alignment. However, the upper inclined face 25D and the lower inclined face 25E of the locator piece 25, and the wedge-shaped horizontal cross section of the locator piece 25 allow the operator to insert the locator piece 25 into the insertion hole 19 easily.

When the locator piece 25 is inserted into the insertion hole 19, the force that supports the loading jig that has been lifting the front end module 12 is slightly decreased. The front end module 12 then moves downward by its own weight such that the bottom face 25A of the locator piece 25 is brought into abutment on the top face of the tongue piece 20 of the insertion hole 19. In this case, keeping the level of the upper face of the tongue piece 20 with respect to the side member 13, the level of the bottom face 23a of the upper periphery of the slit 23 with respect to the front end module 12, and the height of the lateral groove 25L from the bottom portion 25La to the bottom face 25A in the accurate conditions makes it possible to maintain the assembly position of the front end module 12 to the side member 13 with great accuracy.

When the locator piece 25 is completely inserted into the insertion hole 19, the loading jig is removed from the front end module 12.

According to the embodiment of the invention, the locator piece 25 is inserted into the insertion hole 19 so as to temporarily hold the front end module 12 to be fixed to the side member 13. If the front end module 12 is assembled with the side member 13 in the aforementioned temporarily fixed state, the positioning accuracy in fixation of the front end module 12 may be improved.

According to the embodiment, the locator piece 25 inserted into the insertion hole 19 supports part of the weight of the front end module 12. The upper portion of the rear end portion of the front end module 12 is fixed to the side member 13 with two bolts (one for left and right) such that the front end module 12 is temporarily fixed to the side member 13. Accordingly the process for fastening the front portion of the front end module 12 with bolts (see FIG. 12) may be performed subsequently. This makes it possible to reduce the operation time for the process of fixing the front end module 12 to the side member 13.

According to the embodiment, the locator piece 25 is fixed to the bracket plate 21 of the front end module. This may increase the area of the contact between the bracket plate 21 and the locator piece 25 (as indicated by the shaded area). In the case where the contact area is 225 mm$^2$, for example, it is confirmed that the locator piece 25 is capable of bearing the load of 30 kgf. Meanwhile, in the comparative example, as shown in FIG. 11, the cross section area (corresponding to the contact area) of the folded portion of the insert piece 8 is 60 mm$^2$ at most, which cannot bear the load of 30 kgf.

The preferred embodiment described herein is illustrative and not restrictive, and the invention may be practiced or embodied in other ways without departing from the spirit or essential character thereof.

In the embodiment as aforementioned, the locator piece 25 is fixed to the bracket plate 21 of the front end module. However, it is possible to form the locator portion corresponding to the locator piece 25 on the bracket plate 18 of the side member, and a hole corresponding to the insertion hole 19 formed in the bracket plate 21 of the front end module. Then a portion corresponding to the tongue piece 20 may be formed on the upper periphery of the hole corresponding to the insertion hole 19 such that the top face of the locator portion that has been inserted into the hole may abut on the lower face of the portion corresponding to the tongue piece.

The scope of the invention being indicated by the claims, and all variations which come within the meaning of claims are intended to be embraced herein.

The present disclosure relates to subject matters contained in Japanese Patent Application No. 2004-082289, filed on Mar. 22, 2004, the disclosure of which is expressly incorporated herein by reference in its entirety.

What is claimed is:

1. A front end module assembly structure for a vehicle, comprising:
    a first bracket plate provided on either a front end module or a side member to which the front end module is assembled, the first bracket plate having thereon a through hole and a slit extending upward from the through hole;
    a second bracket plate provided on the other of the front end module and the side member to be mated to the first bracket plate, the second bracket plate having an insertion hole formed thereon at a position corresponding to the slit of the first bracket plate, wherein the periphery of the insertion hole is formed to have a horizontal flat plate; and
    a locator piece attached to the first bracket plate, the locator piece having a portion configured to be inserted into the slit from a position inside the through hole and held in the slit, and a bottom face configured to be set on a periphery of the insertion hole when the locator piece is inserted into the insertion hole.

2. The front end module assembly structure according to claim 1, wherein
    either the through hole of the first bracket plate or the insertion hole of the second bracket plate comprises a drain hole for a coating material that resides in the side member.

3. The front end module assembly structure according to claim 1, wherein
    the locator piece is formed to have an engaging portion which is configured to engage with a part of the first bracket plate when the portion of the locator piece is inserted into the slit.

4. The front end module assembly structure according to claim 1, wherein
    the locator piece is formed to have a wedge-shaped horizontal cross section.

* * * * *

UNITED STATES PATENT AND TRADEMARK OFFICE
CERTIFICATE OF CORRECTION

PATENT NO. : 7,188,892 B2  
APPLICATION NO. : 11/082910  
DATED : March 13, 2007  
INVENTOR(S) : Yuichi Tazaki Page 1 of 1

It is certified that error appears in the above-identified patent and that said Letters Patent is hereby corrected as shown below:

On the title page of the Letters Patent,

Under section "(56) references cited, U.S. PATENT DOCUMENTS", add
-- 2003-0160477   08/2003   Sasano et. al. --

Signed and Sealed this

Eighth Day of April, 2008

JON W. DUDAS  
*Director of the United States Patent and Trademark Office*